United States Patent
D'Uva et al.

(10) Patent No.: US 9,193,838 B2
(45) Date of Patent: Nov. 24, 2015

(54) HIGH CONCENTRATION PELLETIZED ADDITIVE CONCENTRATES FOR POLYMER

(75) Inventors: Salvatore D'Uva, Brantford (CA); Zach Charlton, Houston, TX (US); John Lefas, Houston, TX (US)

(73) Assignee: Ingenia Polymers, Inc., Houston, TX (US)

( * ) Notice: Subject to any disclaimer, the term of this patent is extended or adjusted under 35 U.S.C. 154(b) by 0 days.

(21) Appl. No.: 11/900,875

(22) Filed: Sep. 13, 2007

(65) Prior Publication Data
US 2008/0076857 A1    Mar. 27, 2008

Related U.S. Application Data

(60) Provisional application No. 60/844,517, filed on Sep. 14, 2006.

(51) Int. Cl.
*C08J 3/20* (2006.01)
*C08J 3/22* (2006.01)
*C08K 5/00* (2006.01)
*C08L 9/06* (2006.01)

(52) U.S. Cl.
CPC . *C08J 3/22* (2013.01); *C08K 5/005* (2013.01); *C08L 9/06* (2013.01)

(58) Field of Classification Search
CPC ........................................... C08J 3/22
USPC ............................................ 523/351
See application file for complete search history.

(56) References Cited

U.S. PATENT DOCUMENTS

| | | | |
|---|---|---|---|
| 3,404,124 A | 10/1968 | Scott, Jr. et al. | |
| 3,586,247 A | 6/1971 | Perrins | |
| 3,932,323 A | 1/1976 | Perry | |
| 4,366,270 A | 12/1982 | Ruter | |
| 5,053,444 A | 10/1991 | Trotoir | |
| 5,166,235 A | 11/1992 | Bertelli et al. | |
| 5,176,751 A | 1/1993 | Findley | |
| 5,240,642 A | 8/1993 | Neri et al. | |
| 5,308,892 A | 5/1994 | Zickler et al. | |
| 5,516,814 A * | 5/1996 | Trotoir | 523/122 |
| 5,597,857 A | 1/1997 | Thibaut et al. | |
| 5,604,279 A | 2/1997 | Bernhardt et al. | |
| 5,611,962 A | 3/1997 | Garcia et al. | |
| 5,844,042 A | 12/1998 | Neri et al. | |
| 5,854,304 A | 12/1998 | Garcia et al. | |
| 6,255,395 B1 | 7/2001 | Klosiewicz | |
| 6,515,052 B2 | 2/2003 | Semen | |
| 6,596,198 B1 | 7/2003 | Semen | |
| 6,713,545 B2 | 3/2004 | Petiniot et al. | |
| 6,719,941 B1 * | 4/2004 | Frohaug et al. | 264/310 |
| 6,740,694 B2 | 5/2004 | Thibaut et al. | |
| 6,800,228 B1 | 10/2004 | Semen | |
| 2005/0176881 A1 | 8/2005 | Bheda et al. | |
| 2005/0221090 A1 | 10/2005 | Costa | |
| 2005/0228077 A1 * | 10/2005 | Alger et al. | 523/351 |
| 2010/0152341 A1 | 6/2010 | Chatterjee et al. | |

FOREIGN PATENT DOCUMENTS

| | | |
|---|---|---|
| CA | 2014005 | 10/1990 |
| DE | 2922378 | 12/1980 |
| DE | 2922378 A1 | 12/1980 |
| EP | 0 374 816 A | 6/1990 |
| EP | 0423639 | 4/1991 |
| EP | 0565184 | 10/1993 |
| GB | 2 225 018 A | 5/1990 |
| JP | 6-254845 | 9/1994 |
| JP | 2006089708 | 4/2006 |
| WO | 00/11065 | 3/2000 |
| WO | 00/37552 | 6/2000 |
| WO | 2004/039872 | 5/2004 |
| WO | WO 2005/097897 A | 10/2005 |
| WO | 2006/015855 | 2/2006 |
| WO | 2006/064006 | 6/2006 |
| WO | 2008/033410 | 3/2008 |

OTHER PUBLICATIONS

International Search Report and Written Opinion, European Patent Office, Feb. 4, 2008.
European Patent Office, Official Communication, Dec. 23, 2010, Application No. 07811755.3.
European Patent Office, Official Communication, Feb. 24, 2010, Serial No. 07 811 755.3.
European Patent Office, Response to Office Action, Application No. 07811755.3, Jun. 3, 2011.
European Patent Office, Response to Official Action, Application No. 07811755.3, Aug. 19, 2010.
European Patent Office, Response to Rule 70 EPC Communication, Application No. 11174057.7, Jun. 15, 2012.
European Patent Office, Office Action, Application No. 11174057.7, Jul. 27, 2012.
European Patent Office; Response to Office Action; European Patent Application No. 11174057.7; May 28, 2013.
Chinese Patent Office, Office Action prepared for the GCC, GCC Patent Application No. GCC/P/2007/9080, Jan. 21, 2011.
European Patent Office, English translation of Notice of Opposition, BASF Schweiz AG, European Patent No. 2061831, Jan. 3, 2013.
Moreke, Dr. Ing. M.; Process-Oriented Analysis of Melting Polymer Blends; German Plastics Institute; Report 2005.
European Patent Office, Extended European Search Report, Application No. 11174057.7, Nov. 23, 2011.
GCC Patent Office, Examination Report, GCC Patent Application No. GCC/P/2007/20343, Mar. 10, 2014.
European Patent Office, Observations of the Patentee on the Oppositions, European Patent No. 2061831, Aug. 8, 2013.
Indian Patent Office, Response to Office Action, Application No. 00695/MUMNP/2009, May 9, 2013.
European Patent Office, Response to Office Action, Application No. 11174057.7, Nov. 19, 2012.
Indian Patent Office, Office Action, Application No. 00695/MUMNP/2009, Jul. 27, 2012.
European Patent Office, Notice of Opposition, Clariant International, Ltd., European Patent No. 2061831,Jan. 10, 2013.
European Patent Office, Notice of Opposition, The Dow Chemical Company, European Patent No. 2061831, Jan. 10, 2013.

(Continued)

*Primary Examiner* — Peter D Mulcahy
(74) *Attorney, Agent, or Firm* — Clark Hill PLC

(57) ABSTRACT

High concentration pelletized additive concentration or polymer stabilization agent or blends, and their preparations, used in various polymerization processes to enhance stability.

24 Claims, No Drawings

(56) References Cited

OTHER PUBLICATIONS

European Patent Office, Notice of Opposition, BASF Schweiz AG, European Patent No. 2061831, Jan. 3, 2013.
European Patent Office, Notice of Opposition, A. Schulman Plastics, bvba, European Patent No. 2061831, Jan. 11, 2013.
Yancheng City Kelan Pigment Chemical Co., Ltd., Data Sheet for Pigment Red 38.
European Patent Office; Druckexemplar, European Patent No. 2061831, Oct. 19, 2011.
Ciba Inc ; CIGA IRGANOX 1076, 2004.
Nova Chemicals Novapol GM-1224-A Butene LLDPE Masterbatch Resin.
Whiteley, Kenneth S.; Polyethylene; Ullmann's Encyclopedia of Industrial Chemistry; 2012.
Material Data Center Datasheet of DOWLEX 2047G—(PE-LLD), The Dow Chemical Company.
Product Data Sheet, SCLAIR polyethylene; Butene Copolymer LLDPE Injection Molding Resin, Nova Chemicals, Aug. 3, 2010.
2.2.2. The Multiscrew Extruder with More than Two Screws; S. 19 and 20 from Chris Rauwendaal, "Polymer Extrusion", 4th Edition, Oct. 2001, Carl Hanser Verlag, ISBN: 978-3-446-21774-4.
Technical Information; ENGAGE 8180; Polyolefin Elastomer; The Dow Chemical Company, May 2008.
Dow Specialty Elastomers for Thermoplastic Polyolefins; Jim Hemphill; White Paper, The Dow Chemical Company, Sep. 2009.
Tetrabromobisphenol a bis (2,3-dibromopropyl ether), Specification Data Sheet, Yucheng Chemical, Jan. 8, 2010.
70198-29-7, CAS-Registry-Auszug, Nov. 16, 1984.
Ciba Tinuvin 622, Ciba Specialty Chemicals Inc.; Sep. 2006.
3896-11-5, CAS-Registry-Auszug, Nov. 16, 1984.
6683-19-8, CAS-Registry-Auszug, Nov. 16, 1984.
99963-78-7, CAS-Registry-Auszug, Feb. 1, 1986.
15220-83-4, CAS-Registry-Auszug, Nov. 16, 1984.
3572-47-2, CAS-Registry-Auszug, Nov. 16, 1984.
Polywax Polyethylenes, Baker Hughes Incorporated, 2002.
Vergleich Der Systeme, 4th Edition, 1998.
Comparing Twin Screw Extruders and Single Screw Extruders; Plastic Machinery Data, Dec. 19, 2012.
Lawal, A., et al; Analysis of Nonisothermal Screw Extrusion Processing of Viscoplastic Fluids With Significant Back Flow; Chemical Engineering Science 54 (1999), pp. 999-1013.
Van Der Wahl, D.J.; Thesis: Inproving the Properties of Polymer Blends by Reactive Compounding, Rijksuniversiteit Groningen, Jun. 12, 1998; Chapter 6: Modelling and Experimental Evaluation of the Temperature in a Corotating Twin Screw Extruder.
Moneke, Dr.-Ing. M., et al; Prozessnahe Analyse Des Aufschmelzens Von Polymerblends, Deutches Kunstoff-Institut, Bericht 2005.
Esseghir, M., et al; Influence of Particle Size on Melting and Energy Consumption During Compounding: Does the Effect Hold at Scaled-Up Conditions?, Antec 65th vol. (2007), pp. 470-474.
Irganox 1010 MSDS—Aug. 1998.
Butylated hydroxytoluene MSDS—created 2005.
Chang, E.P., et al; Dynamic Mechanical and Thermal Properties of Fire-Retardant High-Impact Polystyrene, Journal of Applied Polymer Science, vol. 21, pp. 2167-2180 (1977).
European Patent Office; Office Action; European Application No. 11 174 057.7; Mar. 14, 2013.

\* cited by examiner

HIGH CONCENTRATION PELLETIZED ADDITIVE CONCENTRATES FOR POLYMER

This application claims priority to U.S. Provisional Patent Application Ser. No. 60/844,517, entitled "High Concentration Pelletized Additive Concentrates for Polymer," filed on Sep. 14, 2006, the entire content of which is hereby incorporated by reference.

BACKGROUND

The invention relates generally to the field of polymer additives and specifically to high concentration pelletized additive concentrates, or polymer stabilization agent or blends, used in various polymerization processes to enhance polymer stability.

Polymer additives and additive blends are typically used to protect polymers from thermo-oxidative degradation, to provide long term resistance to light or heat, to neutralize residual catalyst and to enhance performance properties of the finished product. Polymer additives typically come in powder, granule, or pellet form. These additives can be routinely added to the polymer during post reactor extrusion operations. Numerous techniques may be employed to introduce the additives to the polymer stream. In solution, suspension or slurry phase polymerization processes, additives and additive blends are frequently added to a liquid before being introduced to the post-reactor polymer-liquid slurry. Alternatively, the additives can be added to the final melt stream of polymer via a side arm extruder or other device which can melt the additive and introduce them to the polymer stream. In this case, there will typically be further mixing via an extruder or other mixing device and pumping of the polymer/additive mixture through a die for pelletizing the final polymer. In other polymerization processes such as a gas phase reactor, the polymer exits the reactor as a powdered "reactor granule." In this case, additives can be added to the polymer in several different ways. The additives can be added to the solid "reactor granule" powder stream. This can be packaged off as a final saleable product or it can be further fed to an extruder or other melting device in order to mix and homogenize the polymer and disperse the additives into the molten polymer. When additives are added to the solid "reactor granule" powder stream, the additives can be introduced at this stage via their neat forms, typically powders, or via a concentrate or masterbatch form. This mixture is subsequently pumped through a die for pelletization. Alternatively, in this type of process, the additives can be introduced via a side arm extruder. The side arm extruder melts the additives and feeds them into a molten polymer stream where they are further mixed into the final polymers and pelletized. In all of these techniques, the addition of the additives in powder form can be difficult to handle and feed, and in the case of some additives, they pose a potential health, fire, and explosion risk. If the polymer system requires the addition of several components, the additives must be either pre-blended, or the use of more than one feeder is required. When a side-arm extruder is used, it is not common to feed the powdered additives directly for numerous reasons. In addition to the above mentioned issues with handling and feeding the additives in powder form to the side-arm extruder, the melting and viscosity behaviour of the additives and the additive mixtures are typically not suitable for direct addition via this method. As a result, the powdered additives can be made into a fairly low concentration masterbatch. This type of masterbatch typically is made by extruding a low concentration of additives with a polymer carrier resin that is similar and compatible with the main polymer being produced in the polymerization process. As a result, this masterbatch can be easily fed via a side-arm extruder.

Preparation of non-dusting pellet forms of additive blends solves many of these problems. U.S. Pat. No. 5,240,642 entitled "Process for Obtaining Granular Forms of Additives for Organic Polymers" describes a process for making low-dust granules of an additive blend including a phenol antioxidant and an acid neutralizer processed in the amorphous or molten state including using an extruder.

U.S. Pat. No. 5,844,042 entitled "Process for Obtaining Granular Forms of Additives for Organic Polymers" describes granular forms of additive blends prepared by forcing the blend through a die to form strands and then cutting said strands to form pellets.

U.S. Pat. No. 5,597,857, entitled "Low-Dust Granules of Plastic Additives" describes additive pellets comprising 10-100% calcium stearates.

U.S. Pat. No. 6,740,694B2 entitled "Preparation of Low-Dust Stabilizers" describes using a sub-cooled melt of an additive as a carrier liquid for other additives and as well as amorphous versions of stabilizers.

U.S. Pat. No. 6,515,052 entitled "Granular Polymer Additives and Their Preparation" describes using a solvent in a compaction process to improve the yield and quality of a compacted additive blend including a phosphite.

U.S. Pat. No. 6,800,228 entitled "Sterically Hindered Phenol Antioxidant Granules Having Balance Hardness" describes using a solvent for the preparation of compacted additive blends which including a phenol.

The inventions described above provide for low-dusting forms of additive blends that can be more conveniently and accurately fed to post reactor extrusion operations for addition to a polymer when added directly to a polymer stream that is in the solid phase and premixed or fed simultaneously with the polymer stream into an extruder or other melting device whereby the polymer is melted and the additives are then blended into molten polymer. When the additives require addition via a side-arm extruder and fed directly to a molten polymer stream, the above described additive blends are not used. In this case, masterbatches or concentrates of additives or additive blends in a compatible polymer carrier are used. Masterbatches have the benefit of low friability of the pellet, they can be air conveyed, fed, and extruded using conventional equipment and methods by a side arm extruder.

The preparation of masterbatches is well known in the art. Masterbatches simplify the addition of at least one component to the polymer blend. For economic reasons it is desirable to prepare masterbatches with high levels of additives, and minimize the use of the compatible polymer carrier. This minimizes the amount of masterbatch required to achieve a desired effect.

The preparation of high levels of mineral filled masterbatches is well known in the art. U.S. Pat. No. 6,713,545 B2 entitled "Universal Masterbatch" describes a masterbatch of up to 85% filler, plus a viscosity modifier in a universal SBS carrier. A difficulty in the preparation of masterbatches of high filler concentration is wetting out, mixing and dispersing the filler while maintaining an adequately low viscosity to be able to process the masterbatch. The addition of high levels of filler can greatly increase the viscosity of the masterbatch.

U.S. Pat. No. 6,255,395 B1 to Klosiewicz entitled "Masterbatches Having High Levels of Resin" describes incorporating high levels of hydrocarbon resins into a polymer carrier. The resin preferably has a softening point near or above the softening point of the carrier polymer and has a sufficient viscosity to allow an extruder to put work into the mixture. Preparation of the masterbatches is accomplished above the softening point of the resin.

Many polymer additives, when heated to typical masterbatch processing temperatures, pass through a crystalline melting point or an amorphous phase transition to form low viscosity fluids. Such low viscosity fluids can be difficult to incorporate into a polymer carrier at high levels. Poorly incorporated additive can migrate out of the finished masterbatch pellet. This can cause dusting, stickiness and or agglomeration of the masterbatch pellets. Furthermore the low viscosity additive can substantially decrease the viscosity of the carrier-additive blend, causing difficulties in the pelletization process. For these reasons, masterbatches of polymer additives, with melting points near or below typical masterbatch processing temperatures, are prepared at only low to medium additive levels. It would therefore be advantageous to prepare more economical highly-loaded additive masterbatches of these additives.

SUMMARY

A pelletized additive concentrate for a polymer comprising: at least one primary polymer additive present in a total amount of between about 20 wt. % and about 90 wt. % of the pelletized additive concentrate, the primary polymer additive having a primary polymer-additive melting temperature between about 100° C. and about 200° C.; and at least one primary carrier polymer present in a total amount of between about 10 wt. % and about 80 wt. % of the pelletized additive concentrate, the primary carrier polymer having a primary carrier-polymer melting temperature below the primary polymer-additive melting temperature.

A pelletized additive concentrate for a polymer comprising: a blend of two or more primary polymer additives present in a total amount of between about 20 wt. % and about 90 wt. % of the pelletized additive concentrate, each primary polymer additive having a primary polymer-additive melting temperature between about 100° C. and about 200° C.; and a blend of two or more primary carrier polymers present in a total amount of between about 10 wt. % and about 80 wt. % of the pelletized additive concentrate, each primary carrier polymer having a primary carrier-polymer melting temperature below the primary polymer-additive melting temperature; wherein the pelletized additive concentrate is processed at a temperature lower than the primary polymer-additive melting temperature but higher than, or equal to, the primary carrier-polymer melting temperature The present invention also pertains to high concentration pelletized additive concentrates for polymer, or masterbatches, and methods of making masterbatches of polymer additives. The primary additives used in the present invention are crystalline additives having a peak melting temperature (or primary polymer-additive melting temperature), or amorphous additives having a glass transition temperature (or primary polymer-additive glass transition temperature) within the range of normal processing temperatures of polyolefin masterbatches. The invention illustrates a method of preparing high concentration masterbatches of the primary additive or pelletized additive concentrates, by processing below or near their peak melting or glass transition temperatures.

These masterbatches are useful during polymer production, especially in the manufacture of polymers whereby after polymerization, the polymer is fed to an extruder or other device in which the polymer is molten in order to introduce additives to the molten polymer stream. This is especially true where a side-arm extruder is utilized to introduce the additives. Such additives are essential in improving properties, maintaining properties, and adding functionality or other features to said polymers. Using the techniques of the present invention, high concentrations of additives in a polymer resin carrier can be made which are dust free, and robust in that they are easily conveyed using pneumatic air conveying and are easily fed to an extruder or other device where they are melted and fed into a molten polymer stream. In this step, the additive blend is diluted to the final end-use level for stabilization or introduction of appropriate additive functionality to the polymer being produced. Such high concentration additive blends can also be useful when fed directly to the solid polymer and physically blended with the base polymer prior to the final melting, mixing, and pelletizing, or simultaneously fed to the final melting, mixing, and pelletizing of the base resin being produced. The high additive concentrations produced allow for significant cost savings as these blends are typically up to four times more concentrated than typical additive masterbatches that have been used for this purpose in the past.

DETAILED DESCRIPTION

The particulars of the invention shown herein are by way of example. They are meant to illustrate various embodiments of the invention and not meant to limit the principles or concepts of the invention.

Given below are the condensed and shortened (by no means exhaustive) customary definitions known in the art of certain terms which condensed definitions may aid in the description of the invention.

"Base Polymer": The polymer which is to be colored, functionalized, or otherwise modified by the masterbatch or additives.

"Carrier polymer": polymer used typically as the continuous phase that when combined with fillers, colorants or additives, it will encapsulate them to form a masterbatch. The carrier polymer should be compatible with the base polymer to be modified.

"Masterbatch:" a concentrate of fillers, colorants or additives properly dispersed into a carrier polymer, which is then blended into the base polymer to be colored or modified, rather than adding the filler, colorant or additive directly.

"LLDPE": linear low density polyethylene.

"Melting Point": the peak melting temperature of a crystalline or semi-crystalline polymer or polymer additive as measured by differential scanning calorimetry (DSC).

"Polymer Blend": the final formulation resulting from the combination of the base polymer and a masterbatch, masterbatches, additive or additives.

"Softening Point": the onset of melting temperature as measured by differential scanning calorimetry.

The pelletized additive concentrates, or masterbatch, of the present invention is composed of 2 or more components. One or more of these components is a primary carrier polymer or a blend of primary carrier polymers. The other one or more of the components is a primary polymer additive or blend of primary polymer additives present at a high concentration (>20 wt. % but below 90 wt. %, based on the total weight of the pelletized additive concentrate or masterbatch), characterized by a melting or softening point between 80°-210° C. (the primary polymer-additive melting point or softening point) and more preferably between 100°-200° C. The masterbatch is prepared at a temperature above the melting temperature of the primary polymer carrier (the primary polymer-carrier melting temperature), or blend of primary polymer carriers, and near or below the melting or softening point of at least one of the highly loaded primary additive. Optionally, there may be one or more additional common polymer additives present at a low concentration (<20%) chosen from any of the polymer additives and or fillers known to one skilled in the art. Optionally, there may also be one or more additional common carrier polymers present at low concentrations, preferably below 10 wt. % chosen from any of the carrier polymers known to one skilled in the art. The masterbatch is useful during polymer production, especially in manufacturing of polymers whereby after polymerization, the polymer is fed to an extruder or other device in which the polymer is molten in order to introduce additives to the molten polymer stream, especially via a side-arm extruder.

Unless otherwise specified, percent concentrations in this specification refer to weight percent ("wt. %"). Wt. % is calculated by dividing the weight of the polymer by the weight of all of the elements in the solution not including the solvent. For example, in a pelletized additive concentrate containing 20 grams of primary polymer additive and 80 grams of primary carrier polymer dissolved in a solvent, the wt. % of the primary polymer additive would be 20%.

Preferred carrier polymers of the present invention include polymers, such as polyethylene, polypropylene, ethylene-propylene copolymers, ethylene-alphaolefin copolymers, polystyrene, polypropylene, polybutene, ethylene vinyl acetate copolymers, ethylene vinyl alcohol copolymers, styrene-butadiene copolymers, copolymers, polyolefins, or blends thereof.

The primary polymer additive or additives present at high concentration in the masterbatch of the present invention include those additives known to those skilled in the art as antioxidants, light stabilizers and catalyst neutralizers. These additives include hindered phenols, phosphites, phosphonites, hindered amines, triazines, benzophenones, benzotriazoles, hydroxybenzoates, and metal stearates possessing a melting or softening point in the range of 80°-210° C. and more specifically in the range 100°-200° C.

Hindered phenols are known as antioxidants for plastics and contain one or more groups of the formula 1 given below:

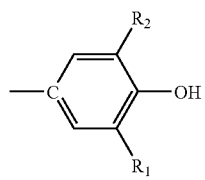

where $R_1$ and $R_2$ are methyl, tert-butyl, unsubstituted alkyls, or substituted alkyls.

Hindered phenols useful as one or more of the highly loaded additives in the present invention should have a melting or softening point in the range of 80°-210° C., more preferably in the range of 100°-200° C. Hindered phenols particularly useful in the present invention include, but are not limited to:

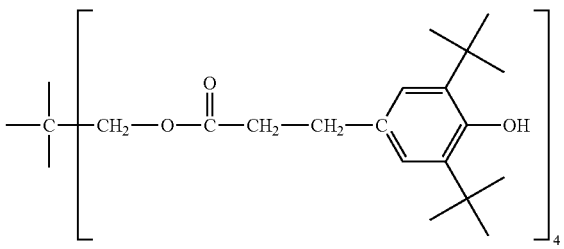

{penterythritol tetrakis(3-(3,5-di-t-butyl-4-hydroxyphenol) propionate)};

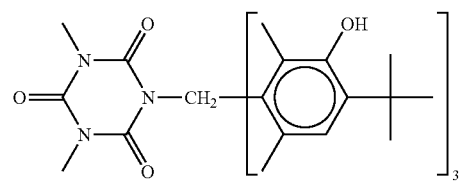

{1,3,5-tris(4-tert-butyl-3-hydroxy-2,6-dimethylbenzyl)-1,3,5-triazine-2,4,6-(1H,3H,5H)-trione};

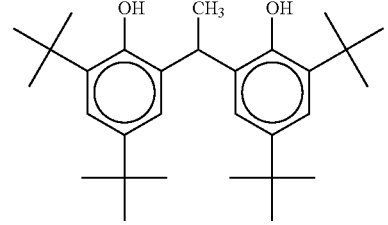

{2,2'-ethlidenebis(4,6-di-tert-butylphenol)};

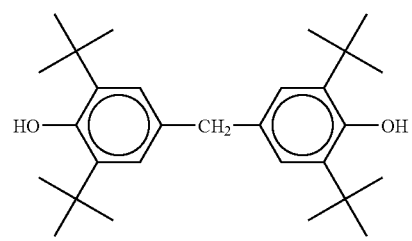

{4,4'-methylenebis(2,6-di-tertiary-butylphenol)}

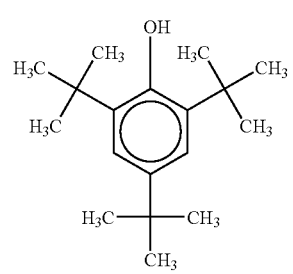

{2,4,6-tri-tert-butylphenol};

Phosphites and phosphonites are also known as antioxidants for plastics. They are predominantly aromatic phosphites and phosphonites. Phosphites and phosphonites useful as one or more of the highly concentrated additives in the present invention have a melting or softening point in the range of 80°-210° C., more preferably in the range of 100°-200° C. Phosphites and phosphonites particularly useful in the present invention include, but are not limited to:

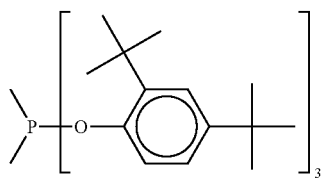

(AO-68)

{tris-(2,4-di-t-butylphenyl)phosphite};

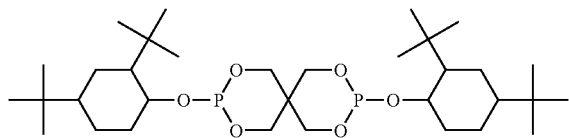

(AO-62)

{bis(2,4-di-t-butylphenyl) pentaerythritol diphosphite};

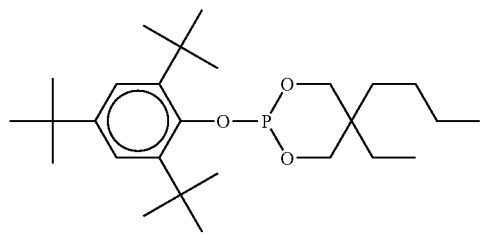

(AO-641)

{2,4,6 tri-t-butylphenyl 2 butyl 2 ethyl 1,3 propane diol phosphite};

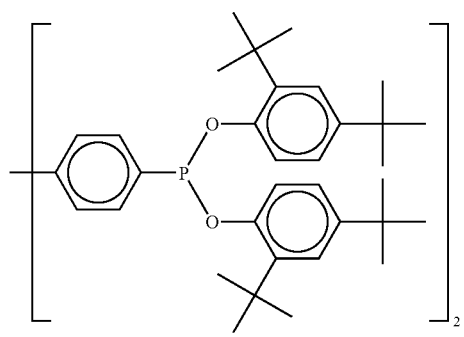

(AO-PEPQ)

{Tetrakis(2,4-di-tert-butylphenyl)[1,1-biphenyl]-4,4'-diyl-bisphosphonite};

Hindered amines useful in the present invention are principally known as hindered amine light stabilizers ("HALS"). They contain one or more groups of the Formula 2 below:

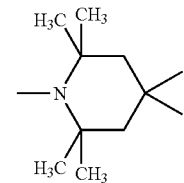

These compounds can be of low or high molecular weights and can be oligomeric or polymeric. HALS useful as the highly concentrated additive in the present invention should have a melting point in the range of 80°-210° C. More preferably, HALS useful in the present invention have a melting point in the range of 100°-200° C. HALS useful as the highly concentrated additive in the present invention include, but are not limited to:

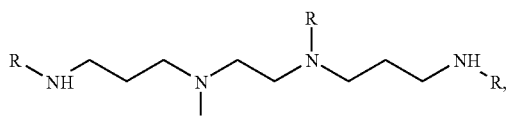

(HALS-119)

where R=

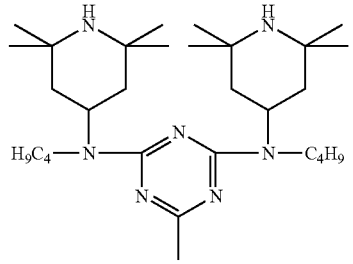

{1,3,5-Triazine-2,4,6-triamine,N,N'''-[1,2-ethane-diyl-bis [[[4,6-bis-[butyl (1,2,2,6,6-pentamethyl-4-piperidinyl) amino]-1,3,5-triazine-2-yl]imino]-3,1-propanediyl]]bis [N',N''-dibutyl-N',N''-bis(1,2,2,6,6-pentamethyl-4-piperidinyl)-};

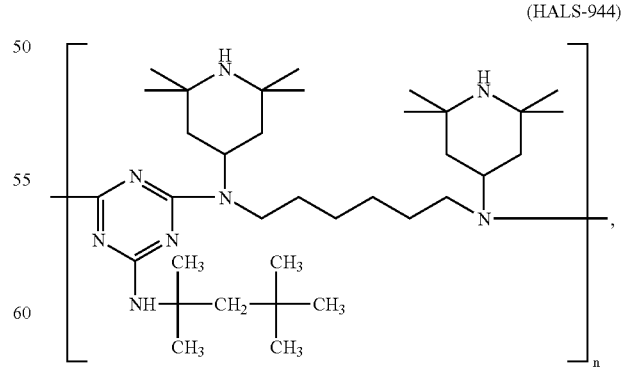

(HALS-944)

where n is 1 or greater,

{Poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]]};

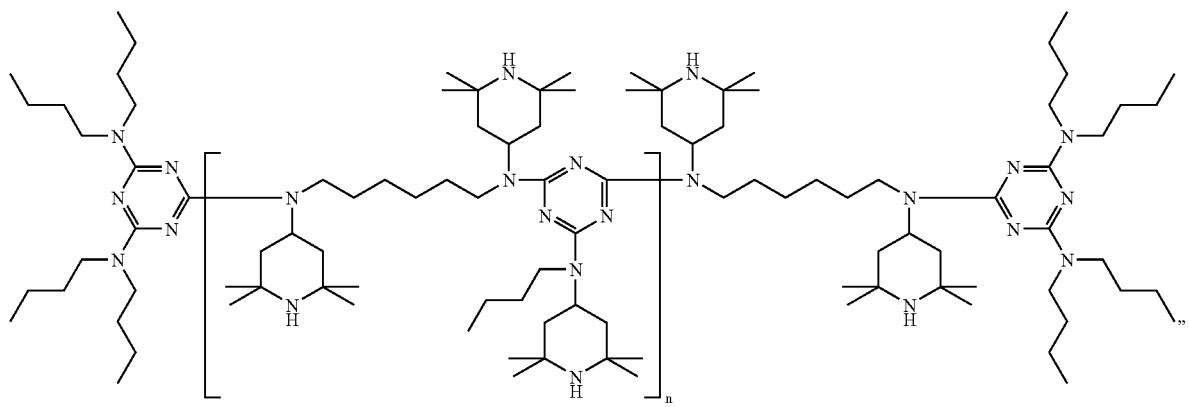
(HALS 20)

{1,6-Hexanediamine, N,N'-bis(2,2,6,6-tetramethyl-4-piperidinyl)-polymer with 2,4,6-trichloro-1,3,5-triazine, reaction products with N-butyl-1-butanamine an N-butyl-2,2,6,6-tetramethyl-4-piperidinamine};

{1,6-hexanediamine, N,N'-bis(2,2,6,6-tetramethyl-4-piperidinyl)-, polymers with morpholine-2,4,6-trichloro-1,3,5-triazine};

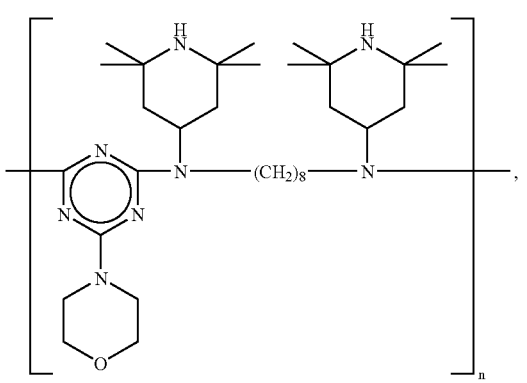
(HALS-3346)

where n is 1 or greater,
{Poly [(6-morpholino-s-triazine-2,4-diyl)[2,2,6,6-tetramethyl-4-piperidyl)imino]-hexamethylene[(2,2,6,6-tetramethyl-4-piperidyl) imino]]};

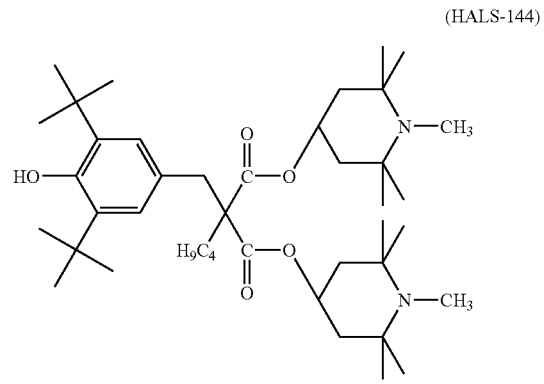
(HALS-144)

{bis(1,22,6,6-pentamethyl-4-piperidinyl)-2-butyl-2-(4-hydroxy-3,5-di-tert-utylbenzyl) propanedioate};

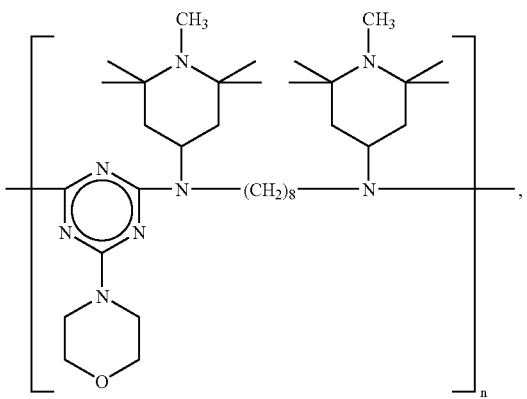
(HALS-3529)

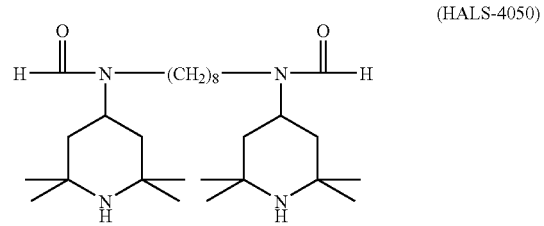
(HALS-4050)

where n is 1 or greater

{N,N'-bisformyl-N,N'-bis-(2,2,6,6-tetramethyl-4-piperidinyl)-hexamethylendiamine};

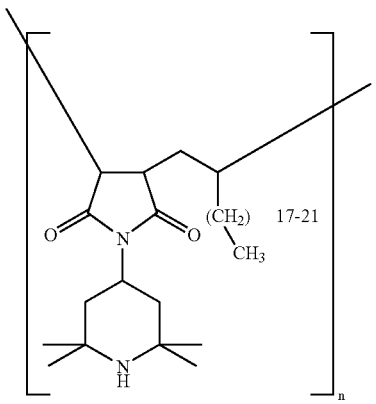
(HALS-5050)

where n is 1 or greater
Oligomeric sterically hindered amine

Triazines useful in the present invention contain one or more groups of the Formula 3 given below:

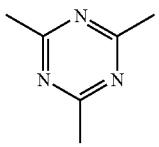

Triazines useful as the highly concentrated additive in the present invention should have a melting point in the range of 80°-210° C. More preferably, triazines useful in the present invention have a melting point in the range of 100°-200° C. Triazines useful as the highly concentrated additive in the present invention include, but are not limited to:

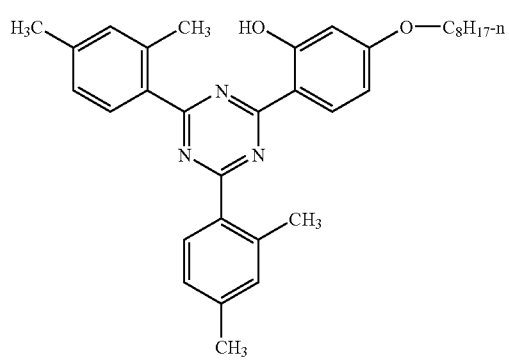
(LS-1164)

{2-(4,6-bis-(2,4-dimethylphenyl)-1,3,5-triazin-2-yl)-5-(octyloxy)-phenol};

Benzophenones useful in the present invention are principally known as light absorbers. They contain one or more groups of the Formula 4 as given below:

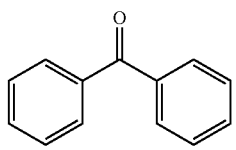 [SMILES: O=C(c1ccccc1)c1ccccc1]

Benzophenones useful as the highly concentrated additive in the present invention should have a melting point in the range of 80°-210° C. More preferably, benzophenones useful in the present invention have a melting point in the range of 100°-200° C.

Benzotriazoles useful in the present invention are principally known as light absorbers. They contain one or more groups of the Formula 5 given below:

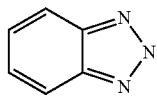

Benzotriazoles useful as the highly concentrated additive in the present invention should have a melting point in the range of 80°-210° C. More preferably, benzotriazoles useful in the present invention have a melting point in the range of 100°-200° C. Benzotriazoles useful as the highly concentrated additive in the present invention include, but are not limited to:

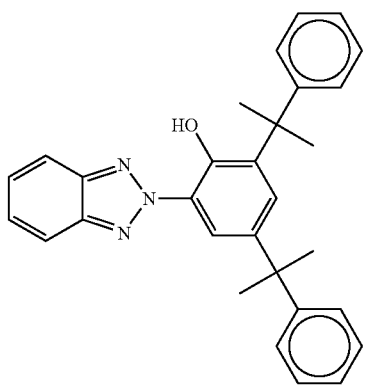
(LS-234)

{2-(2H-benzotriazol-2-yl)-4,6-bis(1-methyl-1-phenylethyl)phenol};

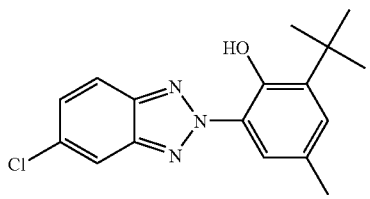
(LS-326)

{2-(3'-tert-butyl-2'-hydroxy-5'-methylphenyl)-5-chlorobenzotriazole};

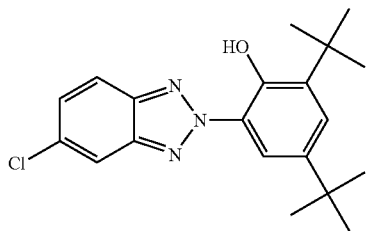

{2-(3',5'-di-tert-butyl-2'-hydroxyphenyl)-5-chlorobenzotriazole};

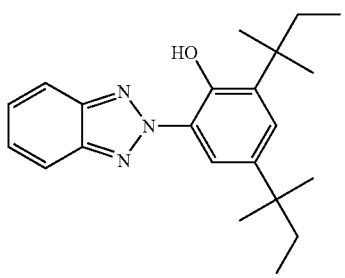

{2-(2H-benzotriazol-2-yl)-4,6-ditertpentylphenol};

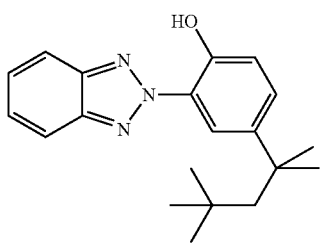

{2-(2H-benzotriazol-2-yl)-4-(1,1,3,3-tetramethylbutyl)phenol};

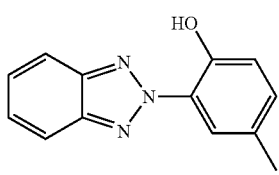

{2-(2H-benzotriazole-2-yl)-4-methylphenyl};

Hydroxybenzoates useful as the highly concentrated additive in the present invention should have a melting point in the range of 80°-210° C. More preferably, hydroxybenzoates useful in the present invention have a melting point in the range of 100°-200° C. Hydroxybenzoates useful as the highly concentrated additive in the present invention include, but are not limited to:

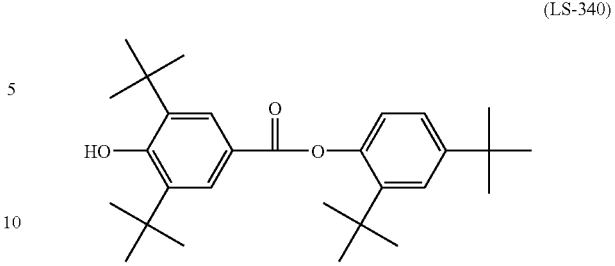

{2,4-di-tert-butylphenyl 3,5-di-t-butyl-4-hydroxybenzoate};

Metal stearates useful as the highly concentrated additive in the present invention should have a melting point in the range of 80°-210° C. More preferably, metal stearates useful in the present invention have a melting point in the range of 100°-200° C. Metal stearates useful as the highly concentrated additive in the present invention include, but are not limited to calcium stearate, zinc stearate, magnesium stearate, and lithium stearate.

The invention also comprises a method for processing a pelletized additive concentrate in a twin screw or multi screw extruder. In one embodiment of this method, the pelletized additive concentrate is maintained during a first stage or stages of the extruder at a temperature lower than the primary carrier-polymer melting temperature such that at least one primary polymer additive and one primary carrier polymer remain substantial as solid. The temperature is then increased at a later stage or stages such that melting, or partial melting, of at least one primary carrier polymer occurs.

In one embodiment of the invention, a primary polymer additive or primary additive blend is fed to an extruder together with a primary polymer carrier resin and forced through a die to produce pellets. During extrusion, the primary polymer carrier resin is melted, such that the melt temperature is maintained below or near the melting point of one or more of the primary additives that is present at a high concentration. The remaining un-melted particles are subjected to shear and or heat and are finely dispersed in molten polymer carrier resin.

The primary polymer additive or additives present at high concentration in the masterbatch of the present invention include the those additives known to those in the art as antioxidants, light stabilizers, and catalyst neutralizers. These additives, include hindered phenols, phosphites, phosphonites, hindered amines, triazines, benzophenones, benzotriazoles, and metal stearates where the peak melting temperature of the additive is in the range of temperatures typically used to process polyolefins, usually between about 200° C. and about 300° C. Additionally, the masterbatch may contain other additives and/or mineral fillers.

Typically, when preparing a masterbatch of, by way of example, an antioxidant blend in linear low density polyethylene carrier, the compounding step is carried out at a processing temperature in the range of 180°-210° C. and up to a temperature considerably higher, such as 300° C. These temperatures allow the melting and dissolution of certain antioxidant additives into the polymer, up to the solubility limits of the additive. Beyond the solubility limits the additive exists as a discrete dispersed phase in the LLDPE. The melted antioxidants typically have a viscosity significantly lower than the molten LLDPE. This can lead to an advantageous reduction in extruder torque and an increase in output at low antioxidant concentrations. However, at higher concentrations, the viscosity of the blend decreases to very low levels, which can cause difficulties in the pelletizing operations. The large difference in the viscosity of the molten antioxidant and carrier resin can make it difficult and even impossible to efficiently mix and disperse the additives. This poor mixing is evident in the finished masterbatch pellets, which can exhibit leaching of the poorly dispersed additive to the surface. This can lead to the formation of dust or stickiness or agglomeration of the masterbatch. During the pelletizing or cooling operations, leaching additive can also be evident in the pellet cooling water, which has associated unwanted processing and environmental effects. It has been discovered that by significantly lowering the processing temperature of these additives near or below the melting point of the highly concentrated antioxidant, a highly concentrated masterbatch can be efficiently made. The viscosity of the concentrate is not reduced to deleterious levels during processing by an additive in liquid form. It has surprisingly been found that the dispersion of the antioxidant blend can be maintained at a high level. Without wanting to be limited by theory, maintaining a high viscosity of the system allows an efficient grinding and or shearing action of the extruder on solid additives. As the carrier resin solidifies, any additive which is present as a discrete dispersed phase will be present as a relatively smaller particle whereby it is encapsulated within the continuous polymeric carrier resin phase and will not easily leach out of the high concentration masterbatch produced. In addition, some polymer additives which possess a high shear viscosity and melt strength near their melting or softening point, can be processed efficiently at temperatures up to just above their melting point.

In another embodiment of the invention, the dispersion and processing ease of the additives can be improved by an inline solid-state grinding step. During extrusion, the first zones of the extruder are maintained at a temperature below the melting point of the primary polymer carrier resin. This leads to an efficient grinding and mixing of the primary additives and polymer in the solid state in high shear regions within the extruder at interfaces such as between the extruder screw and die wall or in mixing sections containing kneading blocks or other mixing devices. In the following zones of the extruder, the temperature of the components is raised above the melting point of the carrier resin and near or below the melting point of at least one of the high concentration primary additive. Such an initial grinding step leads to a fine dispersion in the finished product. This can also eliminate the need for a pre-grinding and or premixing step. It also allows for a fine dispersion of additives while limiting the temperature downstream and the time that the polymer will spend in the molten state.

In yet another embodiment of the invention, a primary polymer additive or additive blend was fed to an extruder or other mixing device together with a primary polymer carrier resin and forced through a die and cut to produce pellets. During mixing, the primary polymer carrier resin was melted, such that the blend temperature was maintained above the melting temperature of the primary carrier polymer and below or near the melting point of one or more of the primary additives that was present at a high concentration. The remaining un-melted particles were subjected to shear and/or heat and were finely dispersed and encapsulated in the molten polymer carrier resin. Optionally one or more other additives or fillers may be present in the masterbatch. As the carrier resin solidified, any additive which was present as a discrete dispersed phase would be present as a relatively smaller particle whereby it was encapsulated within the continuous polymeric carrier resin phase and would not easily migrate out of the high concentration masterbatch produced.

In another embodiment of the invention, the mixing step is carried out in a twin-screw or planetary screw extruder, whereby the dispersion and processing ease of the additives is improved by an inline solid-state grinding step. During extrusion, the first zones of the extruder are maintained at a temperature below the melting point of the primary polymer carrier resin. This leads to an efficient grinding and mixing of the additives and polymer in the solid state in high shear regions within the extruder at interfaces such as between the extruder screw and die wall or in mixing sections containing kneading blocks or other mixing devices. In the following zones of the extruder, the temperature of the components is raised above the melting point of the primary carrier resin and near or below the melting point of at least one of the high concentration primary additive. Such an initial grinding step leads to a fine dispersion in the finished product. This can also eliminate the need for a pre-grinding and or premixing step. It also allows for a fine dispersion of additives while limiting the temperature downstream and the time that the polymer will spend in the molten state.

Example 1

A high concentration additive blend was prepared using the following steps. 6 lbs of GM-1224 (Nova chemicals) was tumble blended with 0.544 lbs of AO-10 (Irganox 1010, Ciba Specialty Chemicals), 0.692 lbs of AO-76 (Irganox 1076, Ciba Specialty Chemicals) and 2.764 lbs of AO-68 (Irgafos 168, Ciba Specialty Chemicals). This blend was then fed to a ZSK30 (Coperion) co-rotating twin screw extruder. The extruder was run with barrel temperatures set at 150 degrees Celsius at a screw speed of 300 RPM using a high-shear screw configuration. The temperature of the mixture at the exit of the extruder was 159 degrees Celsius—below the melting temperature of the Irgafos 168, which is approximately 185 degrees Celsius. The extrudate had a cloudy/milky white appearance indicating that the high concentration additive (Irgafos 168) was still in the solid state at the exit of the die. Good strands were formed under stable extrusion conditions and were cooled and cut into approximately ⅛-inch diameter by ⅛-inch pellets. 100 grams of pellets were placed into a convection oven and aged for 24 hrs at 60 degrees Celsius. The pellets were then removed from the oven and allowed to cool to room temperature for 24 hours. The resulting pellets were observed to be dust free having a smooth outer surface.

Example 2

A high concentration additive blend was prepared using the following steps. 5 lbs of GM-1224 (Nova Chemicals) was tumble blended with 0.68 lbs of Irganox 1010, 0.865 lbs of Irganox 1076 and 3.455 lbs of Irgafos 168. This blend was then fed to a ZSK30 (Coperion) co-rotating twin screw extruder. The extruder was run with barrel temperatures set at 150 degrees Celsius at a screw speed of 300 RPM using a high-shear screw configuration. The temperature of the mixture at the exit of the extruder was 157 degrees Celsius. The extrudate had a cloudy/milky white appearance, formed into good stable strands and were cut into approximately ⅛-inch by ⅛-inch pellets. 100 grams of pellets were placed into a convection oven and aged for 24 hrs at 60 degrees Celsius. The pellets were then removed from the oven and allowed to cool to room temperature for 24 hours. The resulting pellets were observed to be dust free having a smooth outer surface.

Example 3

A high concentration additive blend was prepared using the following steps. 4 lbs of GM-1224 (Nova chemicals) was tumble blended with 0.816 lbs of Irganox 1010, 1.038 lbs of Irganox 1076 and 4.146 lbs of Irgafos 168. This blend was then fed to a ZSK30 (Coperion) co-rotating twin screw extruder. The extruder was run with barrel temperatures set at 150 degrees Celsius at a screw speed of 300 RPM using a high-shear screw configuration. The temperature of the mixture at the exit of the extruder was 157 degrees Celsius. The extrudate had a cloudy/milky white appearance, formed into good stable strands, and were cut into approximately 1/8 inch by 1/8 inch pellets. 100 grams of pellets were placed into a convection oven and aged for 24 hrs at 60 degrees Celsius. The pellets were then removed from the oven and allowed to cool to room temperature for 24 hours. The resulting pellets were observed to be dust free having a smooth outer surface.

Example 4

A high concentration additive blend was prepared using the following steps. 3 lbs of GM-1224 (Nova chemicals) was tumble blended with 0.952 lbs of Irganox 1010, 1.211 lbs of Irganox 1076 and 4.837 lbs of Irgafos 168. This blend was then fed to a ZSK30 (Coperion) co-rotating twin screw extruder. The extruder was run with barrel temperatures set at 150 degrees Celsius at a screw speed of 300 RPM using a high-shear screw configuration. The temperature of the mixture at the exit of the extruder was 157 degrees Celsius. The extrudate had a cloudy/milky white appearance, formed into fairly stable strands, and were cut into approximately 1/8 inch by 1/8 inch pellets. The pellets appeared to be slightly more fragile than what was observed in examples 1, 2 and 3 above. 100 grams of pellets were placed into a convection oven and aged for 24 hrs at 60 degrees Celsius. The pellets were then removed from the oven and allowed to cool to room temperature for 24 hours. The resulting pellets were observed to be dust free having a smooth outer surface.

Example 5

A high concentration additive blend was prepared using the following steps. Dowlex 2047 (Dow Chemical) was ground using an attrition mill to approximately –20 US mesh. 4 lbs of the ground Dowlex 2047 (Dow Chemical) was tumble blended with 0.816 lbs of Irganox 1010, 1.038 lbs of Irganox 1076 and 4.146 lbs of Irgafos 168. This blend was then fed to a ZSK30 (Coperion) co-rotating twin screw extruder. The extruder was run with barrel temperatures set at 150 degrees Celsius at a screw speed of 300 RPM using a high-shear screw configuration. The temperature of the mixture at the exit of the extruder was 158 degrees Celsius. The extrudate had a cloudy/milky white appearance, formed into good stable strands and were cut into approximately 1/8 inch by 1/8 inch pellets. 100 grams of pellets were placed into a convection oven and aged for 24 hrs at 60 degrees Celsius. The pellets were then removed from the oven and allowed to cool to room temperature for 24 hours. The resulting pellets were observed to be dust free having a smooth outer surface.

Example 6

A high concentration additive blend was prepared using the following steps. Sclair 2114 (Nova Chemicals) was ground using an attrition mill to approximately –20 US mesh. 4 lbs of the ground Sclair 2114 was tumble blended with 0.816 lbs of Irganox 1010, 1.038 lbs of Irganox 1076 and 4.146 lbs of Irgafos 168. This blend was then fed to a ZSK30 (Coperion) co-rotating twin screw extruder. The extruder was run with barrel temperatures set at 150 degrees Celsius at a screw speed of 300 RPM using a high-shear screw configuration. The temperature of the mixture at the exit of the extruder was 154 degrees Celsius. The extrudate had a cloudy/milky white appearance, formed into good stable strands, and were cut into approximately 1/8 inch by 1/8 inch pellets. 100 grams of pellets were placed into a convection oven and aged for 24 hrs at 60 degrees Celsius. The pellets were then removed from the oven and allowed to cool to room temperature for 24 hours. The resulting pellets were observed to be dust free having a smooth outer surface.

Example 7

A high concentration additive blend was prepared using the following steps. 4 lbs of GM-1224 (Nova chemicals) was tumble blended with 0.816 lbs of Irganox 1010, 1.038 lbs of Irganox 1076 and 4.146 lbs of Irgafos 168. This blend was then fed to a ZSK30 (Coperion) co-rotating twin screw extruder. The extruder was run with barrel temperatures set at 210 degrees Celsius at a screw speed of 300 RPM using a high-shear screw configuration. The temperature of the mixture at the exit of the extruder was 214 degrees Celsius. The extrudate had a clear and transparent appearance. The strands had poor melt strength but some were cooled and cut into approximately 1/8 inch by 1/8 inch pellets. The pellets were translucent when first pelletized and then slowly became milky white in appearance. 100 grams of pellets were placed into a convection oven and aged for 24 hrs at 60 degrees Celsius. The pellets were then removed from the oven and allowed to cool to room temperature for 24 hours. The resulting pellets appeared to have some powder "dust" on the surface of the pellets.

Example 8

A high concentration additive blend was prepared using the following steps. 4 lbs of GM-1224 (Nova chemicals) was tumble blended with 0.816 lbs of Irganox 1010, 1.038 lbs of Irganox 1076 and 4.146 lbs of Irgafos 168. This blend was then fed to a ZSK30 (Coperion) co-rotating twin screw extruder. The extruder was run with barrel temperatures set at 50 degrees Celsius for the first 3 zones and 150 degrees Celsius for the last 3 zones and at a screw speed of 300 RPM using a high-shear screw configuration. The temperature of the mixture at the exit of the extruder was 151 degrees Celsius. The extrudate had a cloudy/milky white appearance, formed into good stable strands, and were cut into approximately 1/8 inch by 1/8 inch pellets. 100 grams of pellets were placed into a convection oven and aged for 24 hrs at 60 degrees Celsius. The pellets were then removed from the oven and allowed to cool to room temperature for 24 hours. The resulting pellets were observed to be dust free having a smooth outer surface.

Example 9

A high concentration additive blend was prepared using the following steps. 4.4 lbs of GM-1224 (Nova chemicals) was tumble blended with 4.4 lbs of Calcium Stearate HPLG (Chemtura). This blend was then fed to a ZSK30 (Coperion) co-rotating twin screw extruder. The extruder was run with barrel temperatures set at 210 degrees Celsius and at a screw speed of 300 RPM using a high-shear screw configuration. The temperature of the mixture at the exit of the extruder was 203 degrees Celsius. The extrudate had poor melt strength and it was not possible to pull a strand through a water bath for pelletizing. The barrel temperatures were then lowered 145 degrees Celsius set points. The resulting extrudate had a temperature of 127 degrees Celsius. All other process conditions remained the same. The extrudate strand was solid and smooth. It was pulled through a water bath to be cooled and pelletized.

Example 10

A high concentration additive blend was prepared using the following steps. 4.4 lbs of GM-1224 (Nova chemicals) was tumble blended with 4.4 lbs of Tinuvin 326 (Ciba Specialty Chemicals). This blend was then fed to a ZSK30 (Coperion) co-rotating twin screw extruder. The extruder was run with barrel temperatures set at 210 degrees Celsius and at a screw speed of 300 RPM using a high-shear screw configuration. The temperature of the mixture at the exit of the extruder was 202 degrees Celsius. The extrudate had very poor melt strength and it was very yellowish in color. The barrel temperatures were then lowered 155 degrees Celsius set points. The resulting extrudate had a temperature of 130 degrees Celsius. All other process conditions remained the same. The extrudate strand was solid and smooth. It was pulled through a water bath to be cooled and pelletized. It was less yellow in appearance.

Example 11

A high concentration additive blend was prepared using the following steps. 4.4 lbs of LF-0718 (Nova chemicals) was tumble blended with 4.4 lbs of HALS-944 (Chimassorb 944, Ciba Specialty Chemicals). This blend was then fed to a ZSK30 (Coperion) co-rotating twin screw extruder. The extruder was run with barrel temperatures set at 210 degrees Celsius and at a screw speed of 300 RPM using a high-shear screw configuration. The temperature of the mixture at the exit of the extruder was 202 degrees Celsius. The extrudate had very poor melt strength, it was surging and unable to pelletize. The barrel temperatures were then lowered 125 degrees Celsius set points. The resulting extrudate had a temperature of 114 degrees Celsius. All other process conditions remained the same. The extrudate strand was solid and smooth. It was pulled through a water bath to be cooled and pelletized.

What is claimed is:

1. An additive concentrate for a polymer consisting essentially of:
    at least one crystalline or amorphous primary polymer additive present in a total amount of between about 25 wt. % and about 90 wt. % of the additive concentrate, the primary polymer additive having a primary polymer-additive melting temperature between about 100° C. and about 200° C.; and
    at least one primary carrier polymer present in a total amount of between about 10 wt. % and about 75 wt. % of the additive concentrate, the primary carrier polymer having a primary carrier-polymer melting temperature below the crystalline or amorphous primary polymer-additive melting temperature;
    wherein the concentrate, the primary polymer additive and the primary carrier polymer have been processed at a temperature lower than the primary polymer-additive melting temperature and higher than, or equal to, the primary carrier-polymer melting temperature, and wherein the additive concentrate is in the form of pellets.

2. The additive concentrate of claim 1, wherein the crystalline or amorphous primary polymer additive is a hindered phenol, a phosphite, a phosphonite, a hindered amine, a triazine, a benzophenone, a benzotriazole, a hydroxybenzoate, or a metal stearate.

3. The additive concentrate of claim 1, wherein the primary carrier polymer is a polyolefin, such as polyethylene, polypropylene, ethylene-propylene copolymers, ethylene-alphaolefin copolymers, polystyrene, polypropylene, polybutene, ethylene vinyl acetate copolymers, ethylene vinyl alcohol copolymers, styrene-butadiene copolymers, copolymers, polyolefins, or blends thereof.

4. The additive concentrate of claim 1, further comprising one or more additional crystalline or amorphous polymer additives present in a total amount of less than about 20 wt. %, each additional crystalline or amorphous polymer additive having an additional crystalline or amorphous polymer-additive melting temperature of lower than about 100° C. or higher than about 200° C.

5. The additive concentrate of claim 1, further comprising one or more additional carrier polymers present in a total amount of less than about 10 wt. %, each additional carrier polymer having an additional carrier-polymer melting temperature below, higher than, or equal to, the primary polymer-additive melting temperature.

6. An additive concentrate for a polymer consisting essentially of:
    a blend of two or more crystalline or amorphous primary polymer additives present in a total amount of between about 25 wt. % and about 90 wt. % of the additive concentrate, each crystalline or amorphous primary polymer additive having a crystalline or amorphous primary polymer-additive melting temperature between about 100° C. and about 200° C.; and
    a blend of two or more primary carrier polymers present in a total amount of between about 10 wt. % and about 75 wt. % of the additive concentrate, each primary carrier polymer having a primary carrier-polymer melting temperature below the crystalline or amorphous primary polymer-additive melting temperature; wherein the additive concentrate is processed at a temperature lower than the crystalline or amorphous primary polymer-additive melting temperature but higher than, or equal to, the primary carrier-polymer melting temperature;
    wherein the additive concentrate is in the form of pellets.

7. The additive concentrate of claim 6, wherein the crystalline or amorphous primary polymer additives are hindered phenols, phosphites, phosphonites, hindered amines, triazines, benzophenones, benzotriazoles, hydroxybenzoates, or a metal stearate.

8. The additive concentrate of claim 6, wherein the primary carrier polymers are polyolefins, such as polyethylene, polypropylene, ethylene-propylene copolymers, ethylene-alphaolefin copolymers, polystyrene, polypropylene, polybutene, ethylene vinyl acetate copolymers, ethylene vinyl alcohol copolymers, styrene-butadiene copolymers, copolymers, polyolefins, or blends thereof.

9. The additive concentrate of claim 6, further comprising one or more additional crystalline or amorphous polymer additives present in a total amount of less than about 20 wt. %, each additional crystalline or amorphous polymer additive having an additional polymer-additive melting temperature of lower than about 100° C. or higher than about 200° C.

10. The additive concentrate of claim 6, further comprising one or more additional carrier polymers present in a total amount of less than about 10 wt. %, each additional carrier polymer having an additional carrier-polymer melting temperature below the crystalline or amorphous primary polymer-additive melting temperature.

11. A method for preparing a masterbatch consisting of an additive concentrate of claim 1, the method comprising:
  a) selecting a crystalline or amorphous primary polymer additive to have a melting temperature higher than the melting temperature of the primary carrier polymer; and
  b) processing the pelletized additive concentrate at a temperature lower than the crystalline or amorphous primary polymer-additive melting temperature but higher than, or equal to, the primary carrier polymer melting temperature.

12. The method of claim 11, further comprising:
  adding the at least one primary polymer additive and at least one primary carrier polymer to a twin screw or multi screw extruder;
  maintaining, at a first stage or stages of the extruder, a temperature lower than a primary carrier-polymer melting temperature of the primary carrier polymer whereby the at least one crystalline or amorphous primary polymer additive and the at least one primary carrier polymer remain substantially as solid; and
  increasing a process temperature in a later stage or stages whereby melting of at least one primary carrier polymer occurs.

13. The additive concentrate of claim 1, wherein the primary carrier polymer is linear low density polyethylene compounding resin, and the crystalline or amorphous primary polymer additive is tris(2,4-di-(tert)-butylphenyl)phosphate.

14. The additive concentrate of claim 1, wherein the primary carrier polymer is linear low density polyethylene plastic material, and the crystalline or amorphous primary polymer additive is tris(2,4-di-(tert)-butylphenyl)phosphate.

15. The additive concentrate of claim 1, wherein the primary carrier polymer is butene copolymer linear low density polyethylene, and the crystalline or amorphous primary polymer additive is tris(2,4-di-(tert)-butylphenyl)phosphate.

16. The additive concentrate of claim 1, wherein the primary carrier polymer is linear low density polyethylene compounding resin, and the crystalline or amorphous primary polymer additive is Calcium Stearate.

17. The additive concentrate of claim 1, wherein the primary carrier polymer is linear low density polyethylene compounding resin, and the crystalline or amorphous primary polymer additive is hydroxyphenylbenzotriazole UV absorber.

18. The additive concentrate of claim 1, wherein the primary carrier polymer is film grade low density polyethylene thermoplastic, and the crystalline or amorphous primary polymer additive is poly[[6-[(1,1,3,3-tetramethylbutyl)amino]-s-triazine-2,4-diyl]-[(2,2,6,6-tetramethyl-4-piperidyl)imino]-hexamethylene-[(2,2,6,6-tetramethyl-4-piperidyl)imino]].

19. The method of claim 11 wherein the masterbatch is processed in a twin screw or multi screw extruder.

20. The method of claim 11, wherein the masterbatch further comprises less than 20% of one or more additional crystalline or amorphous polymer additives or polymer fillers.

21. The method of claim 20, wherein the crystalline or amorphous primary polymer additives or additional crystalline or amorphous polymer additives are selected from the group consisting of: hindered phenols, phosphites, phosphonites, hindered amines, triazines, benzophenones, hydroxybenzoates, or a metal stearate.

22. The method claim 11, wherein the masterbatch further comprises less than 10% of one or more additional carrier polymers.

23. The method of claim 22, wherein the primary carrier polymers or additional carrier polymers are polyolefins, such as polyethylene, polypropylene, ethylene-propylene copolymers, ethylene-alphaolefin copolymers, polystyrene, polypropylene, polybutene, ethylene vinyl acetate copolymers, ethylene vinyl alcohol copolymers, styrene-butadiene copolymers, copolymers, polyolefins, or blends thereof.

24. The method of claim 11, wherein the masterbatch is cooled and cut into pellets and aged in an oven at 60° C. for 24 hours.

* * * * *